US007992176B2

(12) United States Patent
Margulis

(10) Patent No.: US 7,992,176 B2
(45) Date of Patent: *Aug. 2, 2011

(54) APPARATUS AND METHOD FOR EFFECTIVELY IMPLEMENTING A WIRELESS TELEVISION SYSTEM

(75) Inventor: Neal Margulis, Woodside, CA (US)

(73) Assignee: Sling Media, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/758,196

(22) Filed: Apr. 12, 2010

(65) Prior Publication Data

US 2010/0192186 A1    Jul. 29, 2010

Related U.S. Application Data

(60) Division of application No. 09/809,868, filed on Mar. 15, 2001, now Pat. No. 7,725,912, which is a continuation of application No. 09/318,904, filed on May 26, 1999, now Pat. No. 6,263,503.

(51) Int. Cl.
    *H04N 7/16* (2011.01)
(52) U.S. Cl. .......................... 725/80; 725/81; 725/82
(58) Field of Classification Search .................... 725/78, 725/81, 82, 80
    See application file for complete search history.

(56) References Cited

U.S. PATENT DOCUMENTS

| 3,416,043 | A | 12/1968 | Jorgensen |
| 4,254,303 | A | 3/1981 | Takizawa |
| 5,132,992 | A | 7/1992 | Yurt et al. |
| 5,161,021 | A | 11/1992 | Tsai |
| 5,237,648 | A | 8/1993 | Mills et al. |
| 5,321,846 | A * | 6/1994 | Yokota et al. ............ 725/80 |
| 5,386,493 | A | 1/1995 | Degen et al. |
| 5,434,590 | A | 7/1995 | Dinwiddie, Jr. et al. |
| 5,493,638 | A | 2/1996 | Hooper et al. |
| 5,602,589 | A | 2/1997 | Vishwanath et al. |
| 5,661,516 | A | 8/1997 | Carles |
| 5,666,426 | A | 9/1997 | Helms |
| 5,682,195 | A | 10/1997 | Hendricks et al. |

(Continued)

FOREIGN PATENT DOCUMENTS

CN    1464685 A    12/2003

(Continued)

OTHER PUBLICATIONS

China State Intellectual Property Office "First Office Action," issued Jul. 31, 2009, for Application No. 200580026825.

(Continued)

*Primary Examiner* — William Trost, IV
*Assistant Examiner* — Chris Parry
(74) *Attorney, Agent, or Firm* — Ingrassia Fisher & Lorenz, P.C.

(57) ABSTRACT

An apparatus and method for effectively implementing a wireless television system may include a communications processor and a transmitter device that combine at least one of a local-area network interface, a wide-area network interface, and one or more television data interfaces for effectively performing a wireless network transmission process. A transmitted stream from the wireless television system may be received via wireless network processing for viewing local-area network data, wide-area network data (such as Internet data), or television data by flexibly utilizing various electronic devices such as a notepad personal computer, a personal digital assistant (PDA), or a handheld TV remote control device.

23 Claims, 9 Drawing Sheets

U.S. PATENT DOCUMENTS

| | | |
|---|---|---|
| 5,706,290 A | 1/1998 | Shaw et al. |
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Maasud et al. |
| 6,788,882 B1 | 9/2004 | Geer et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | Dacosta |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,565,681 B2 | 7/2009 | Ngo et al. |
| 7,583,676 B2 * | 9/2009 | Shobatake ............... 370/395.1 |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0019984 A1 | 2/2002 | Rakib |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0080753 A1 | 6/2002 | Lee |
| 2002/0090029 A1 | 7/2002 | Kim |
| 2002/0105529 A1 | 8/2002 | Bowser et al. |

| | | |
|---|---|---|
| 2002/0112247 A1 | 8/2002 | Horner et al. |
| 2002/0122137 A1 | 9/2002 | Chen et al. |
| 2002/0131497 A1 | 9/2002 | Jang |
| 2002/0138843 A1 | 9/2002 | Samaan et al. |
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2003/0001880 A1 | 1/2003 | Holtz et al. |
| 2003/0028873 A1 | 2/2003 | Lemmons |
| 2003/0065915 A1 | 4/2003 | Yu et al. |
| 2003/0093260 A1 | 5/2003 | Dagtas et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0208612 A1 | 11/2003 | Harris et al. |
| 2003/0231621 A1 | 12/2003 | Gubbi et al. |
| 2004/0003406 A1 | 1/2004 | Billmaier |
| 2004/0052216 A1 | 3/2004 | Roh |
| 2004/0068334 A1 | 4/2004 | Tsai et al. |
| 2004/0083301 A1 | 4/2004 | Murase et al. |
| 2004/0100486 A1 | 5/2004 | Flamini et al. |
| 2004/0103340 A1 | 5/2004 | Sundareson et al. |
| 2004/0139047 A1 | 7/2004 | Rechsteiner et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0205830 A1 | 10/2004 | Kaneko |
| 2004/0212640 A1 | 10/2004 | Mann et al. |
| 2004/0216173 A1 | 10/2004 | Horoszowski et al. |
| 2004/0236844 A1 | 11/2004 | Kocherlakota |
| 2004/0255249 A1 | 12/2004 | Chang et al. |
| 2005/0021398 A1 | 1/2005 | McCleskey et al. |
| 2005/0027821 A1 | 2/2005 | Alexander et al. |
| 2005/0038981 A1 | 2/2005 | Connor et al. |
| 2005/0044058 A1 | 2/2005 | Matthews et al. |
| 2005/0050462 A1 | 3/2005 | Whittle et al. |
| 2005/0053356 A1 | 3/2005 | Mate et al. |
| 2005/0055595 A1 | 3/2005 | Frazer et al. |
| 2005/0060759 A1 | 3/2005 | Rowe et al. |
| 2005/0097542 A1 | 5/2005 | Lee |
| 2005/0114852 A1 | 5/2005 | Chen et al. |
| 2005/0132351 A1 | 6/2005 | Randall et al. |
| 2005/0138560 A1 | 6/2005 | Lee et al. |
| 2005/0198584 A1 | 9/2005 | Matthews et al. |
| 2005/0204046 A1 | 9/2005 | Watanabe |
| 2005/0216851 A1 | 9/2005 | Hull et al. |
| 2005/0227621 A1 | 10/2005 | Katoh |
| 2005/0229118 A1 | 10/2005 | Chiu et al. |
| 2005/0246369 A1 | 11/2005 | Oreizy et al. |
| 2005/0251833 A1 | 11/2005 | Schedivy |
| 2005/0262534 A1 | 11/2005 | Bontempi et al. |
| 2005/0283791 A1 | 12/2005 | McCarthy et al. |
| 2005/0288999 A1 | 12/2005 | Lerner et al. |
| 2006/0011371 A1 | 1/2006 | Fahey |
| 2006/0031381 A1 | 2/2006 | Van Luijt et al. |
| 2006/0050970 A1 | 3/2006 | Gunatilake |
| 2006/0051055 A1 | 3/2006 | Ohkawa |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | Van Beek |
| 2006/0095943 A1 | 5/2006 | Demircin et al. |
| 2006/0107226 A1 | 5/2006 | Matthews et al. |
| 2006/0117371 A1 | 6/2006 | Margulis |
| 2006/0146174 A1 | 7/2006 | Hagino |
| 2006/0280157 A1 | 12/2006 | Karaoguz et al. |
| 2007/0003224 A1 | 1/2007 | Krikorian et al. |
| 2007/0005783 A1 | 1/2007 | Saint-Hillaire et al. |
| 2007/0022328 A1 | 1/2007 | Tarra et al. |
| 2007/0074115 A1 | 3/2007 | Patten et al. |
| 2007/0076604 A1 | 4/2007 | Litwack |
| 2007/0168543 A1 | 7/2007 | Krikorian et al. |
| 2007/0180485 A1 | 8/2007 | Dua |
| 2007/0198532 A1 | 8/2007 | Krikorian et al. |
| 2007/0234213 A1 | 10/2007 | Krikorian et al. |
| 2007/0260462 A1 | 11/2007 | Andersen et al. |
| 2007/0286596 A1 | 12/2007 | Lonn |
| 2008/0019276 A1 | 1/2008 | Takatsuji et al. |
| 2008/0037573 A1 | 2/2008 | Cohen |
| 2008/0059533 A1 | 3/2008 | Krikorian |
| 2008/0134267 A1 | 6/2008 | Moghe et al. |
| 2008/0195744 A1 | 8/2008 | Bowra et al. |
| 2008/0199150 A1 | 8/2008 | Candelore |
| 2008/0256485 A1 | 10/2008 | Krikorian |
| 2008/0294759 A1 | 11/2008 | Biswas et al. |
| 2008/0307456 A1 | 12/2008 | Beetcher et al. |
| 2008/0307462 A1 | 12/2008 | Beetcher et al. |
| 2008/0307463 A1 | 12/2008 | Beetcher et al. |
| 2009/0074380 A1 | 3/2009 | Boston et al. |
| 2009/0080448 A1 | 3/2009 | Tarra et al. |
| 2009/0102983 A1 | 4/2009 | Malone et al. |
| 2009/0103607 A1 | 4/2009 | Bajpai et al. |
| 2009/0157697 A1 | 6/2009 | Conway et al. |
| 2009/0177758 A1 | 7/2009 | Banger et al. |
| 2009/0199248 A1 | 8/2009 | Ngo et al. |
| 2010/0001960 A1 | 1/2010 | Williams |
| 2010/0005483 A1 | 1/2010 | Rao |
| 2010/0064055 A1 | 3/2010 | Krikorian et al. |
| 2010/0064332 A1 | 3/2010 | Krikorian et al. |
| 2010/0070925 A1 | 3/2010 | Einaudi et al. |
| 2010/0071076 A1 | 3/2010 | Gangotri et al. |
| 2010/0100915 A1 | 4/2010 | Krikorian et al. |

FOREIGN PATENT DOCUMENTS

| | | |
|---|---|---|
| DE | 4407319 A1 | 9/1994 |
| EP | 0838945 A | 4/1998 |
| EP | 1077407 A1 | 2/2001 |
| EP | 1443766 A2 | 8/2004 |
| EP | 1691550 A | 8/2006 |
| EP | 1803558 A1 | 9/2007 |
| GB | 2307151 A | 5/1997 |
| JP | 2003046582 A | 2/2003 |
| JP | 2003114845 A | 4/2003 |
| JP | 2004015111 A | 1/2004 |
| KR | 20010211410 A | 8/2001 |
| KR | 19990082855 A | 2/2010 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 20060074110 A | 7/2006 |
| WO | 2007027891 A2 | 3/2007 |
| WO | 2007051156 A2 | 5/2007 |
| WO | 2007141555 A2 | 12/2007 |
| WO | 2007149466 A2 | 12/2007 |
| WO | 2008024723 A | 2/2008 |

OTHER PUBLICATIONS

USPTO, Non-Final Office Action, mailed Aug. 4, 2009; U.S. Appl. No. 11/734,277, filed Apr. 12, 2007.

USPTO, Non-Final Office Action, mailed Jul. 31, 2009; U.S. Appl. No. 11/683,862, filed Mar. 8, 2007.

USPTO, Non-Final Office Action, mailed Aug. 5, 2009; U.S. Appl. No. 11/147,663, filed Jun. 7, 2005.

USPTO, Non-Final Office Action, mailed Sep. 3, 2009; U.S. Appl. No. 11/620,711, filed Jan. 7, 2007.

Nandury, Venkata Kishore "Adaptive Gain Control for Digital Audio Samples in a Media Stream," U.S. Appl. No. 12/507,971, filed Jul. 23, 2009.

Malode, Deepak Ravi "Remote Control and Method for Automatically Adjusting the Volume Output of an Audio Device," U.S. Appl. No. 12/550,145, filed Aug. 28, 2009.

Akella, Aparna Sarma "Systems and Methods for Event Programming Via a Remote Media Player," U.S. Appl. No. 12/537,057, filed Aug. 6, 2009.

Shah, Bhupendra Natwerlan et al. "Systems and Methods for

Transcoding and Place Shifting Media Content," U.S. Appl. No. 12/548,130, filed Aug. 26, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Lucas, Brian et al. "Systems and Methods for Establishing Connections Between Devices Communicating Over a Network," U.S. Appl. No. 12/426,103, filed Apr. 17, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
Australian Government "Office Action," Australian Patent Application No. 2006240518, mailed Nov. 12, 2009.
Thiyagarajan, Venkatesan et al. "Always-On-Top Media Player Launched From a Web Browser," U.S. Appl. No. 12/617,271, filed Nov. 12, 2009.
USPTO, Final Office Action, mailed Nov. 6, 2009; U.S. Appl. No. 09/809,868, filed Mar. 15, 2001.
USPTO, Final Office Action mailed Nov. 12, 2009; U.S. Appl. No. 11/620,707, filed Jan. 7, 2007.
Newton's Telecom Dictionary, 21st ed., Mar. 2005.
European Patent Office, European Search Report, mailed Sep. 28, 2009 for European Application No. EP 06 78 6175.
Paul, John Michael et al. "Systems and Methods for Delivering Messages Over a Network," U.S. Appl. No. 12/619,192, filed Nov. 16, 2009.
USPTO Final Office Action mailed Jan. 25, 2010; U.S. Appl. No. 11/734,277, filed Apr. 12, 2007.
USPTO, Non-Final Office Action mailed Nov. 23, 2009; U.S. Appl. No. 11/683,862, filed Mar. 8, 2007.
International Search Report for PCT/US2008/069914 mailed Dec. 19, 2008.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
USPTO, Non-Final Office Action mailed Oct. 1, 2009; U.S. Appl. No. 11/778,287, filed Jul. 16, 2007.
Rao, Padmanabha R. et al. "Methods and Apparatus for Establishing Network Connections Using an Inter-Mediating Device," U.S. Appl. No. 12/642,368, filed Dec. 18, 2009.
Dham, Vikram et al. "Systems and Methods for Establishing Network Connections Using Local Mediation Services," U.S. Appl. No. 12/644,918, filed Dec. 22, 2009.
Paul, John et al. "Systems and Methods for Remotely Controlling Media Server Via a Network," U.S. Appl. No. 12/645,870, filed Dec. 23, 2009.
USPTO Final Office Action mailed Dec. 30, 2009; U.S. Appl. No. 11/147,664 filed Jun. 7, 2005.
Meyer, Derrick "MyReplayTV—™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
PCT Partial International Search, PCT/US2009/054893, mailed Dec. 23, 2009.
Bajpal, Parimal et al. "Method and Node for Transmitting Data Over a Communication Network using Negative Ackhowledgement," U.S. Appl. No. 12/404,920, filed Mar. 16, 2009.
Bajpal, Parimal et al. "Method and Note for Employing Network connections Over a Connectionless Transport Layer Protocol," U.S. Appl. No. 12/405,062, filed Mar. 16, 2009.
Asnis, Ilya et al. "Mediated Network address Translation Traversal" U.S. Appl. No. 12/405,039, filed Mar. 16, 2009.
Srisuresh, P. et al. "Traditional IP Network Address Translator (Traditional NAT)," Network Working Group, The Internet Society, Jan. 2001.
Paul, John et al. "Systems and Methods for Searching Media Content," U.S. Appl. No. 12/648,024, filed Dec. 28, 2009.
China State Intellectual Property Office "First Office Action," Jan. 8, 2010; Application No. 200810126554.0.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
Gurzhi, Alexander et al. "Systems and Methods for Emulation Network-Enabled Media Components," U.S. Appl. No. 12/711,830, filed Feb. 24, 2010.
Newton's Telcom Dictionary, 20th ed., Mar. 2004.
"The Authoritative Dictionary of IEEE Standard Terms," 7th ed. 2000.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01 &pagetype+printer§ion+1053801318705&path+articles/2003/06/30/0156825330084.html].
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
Kulkarni, Anant Madhava "Systems and Methods for Creating Logical Media Streams for Media Storage and Playback," U.S. Appl. No. 12/323,907, filed Nov. 26, 2008.

Rao, Padmanabha R. "Systems and Methods for Linking Media Content," U.S. Appl. No. 12/359,784, filed Jan. 26, 2009.
International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US2006/025911, mailed Jan. 3, 2007.
European Patent Office "European Search Report," mailed May 7, 2010 for Application No. 06786174.0.
Margulis, Neal "Apparatus and Method for Effectively Implementing a Wireless Television System," U.S. Appl. No. 12/758,193, filed Apr. 12, 2010.
Margulis, Neal "Apparatus and Method for Effectively Implementing a Wireless Television System," U.S. Appl. No. 12/758,194, filed Apr. 12, 2010.
Jain, Vikal Kumar "Systems and Methods for Coordinating Data Communication Between Two Devices," U.S. Appl. No. 12/699,280, filed Feb. 3, 2010.
Krikorian, Jason Gary et al. "Personal Media Broadcasting System with Output Buffer," U.S. Appl. No. 12/757,697, filed Apr. 9, 2010.
Tarra, Raghuveer et al. "Firmware Update for Consumer Electronic Device," U.S. Appl. No. 12/757,714, filed Apr. 9, 2010.
China State Intellectual Property Office "Office Action," issued Apr. 13, 2010; Application No. 200580026825.X.
Canadian Intellectual Property Office "Office Action" mailed Feb. 18, 2010 for Application No. 2569610.
China State Intellectual Property Office "Office Action" issued Mar. 18, 2010, for Application No. 200680022520.6.
European Patent Office, European Search Report for European Application No. EP 08 16 7880, mailed Mar. 4, 2009.
Mythtv Wiki, "MythTV User Manual" [Online], Aug. 27, 2007, XP002515046; retrieved from the Internet: <URL: http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809.868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast: Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
International Search Report and Written Opinion for International Application No. PCT/US20061025912, mailed Jul. 17, 2008.
International Search Report for International Application No. PCT/US2008/059613, mailed Jul. 21, 2008.
International Search Report and Written Opinion for International Application No. PCT/US2008/080910, mailed Feb. 16, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Wikipedia "LocationFree Player" [Online], Sep. 22, 2007, XP002512400; retrieved from the Internet: <URL:http://en.wikipedia.org/w/index.php?title=LocationFree_Player&oldid=159683564>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v12.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>, retrieved on Jan. 28, 2009.

USPTO Final Office Action mailed Mar. 3, 2010; U.S. Appl. No. 11/111,265, filed Apr. 21, 2005.

USPTO Final Office Action mailed Mar. 12, 2010; U.S. Appl. No. 11/620,711, filed Jan. 7, 2007.

USPTO Non-Final Office Action mailed Mar. 19, 2010; U.S. Appl. No. 11/147,664, filed Jun. 7, 2005.

USPTO Non-Final Office Action mailed Mar. 31, 2010; U.S. Appl. No. 11/620,707, filed Jan. 7, 2007.

USPTO Non-Final Office Action mailed Apr. 1, 2010; U.S. Appl. No. 12/237,103, filed Sep. 24, 2008.

European Patent Office, International Searching Authority, "International Search Report," mailed Mar. 30, 2010; International Application PCT/US2009/068468 filed Dec. 27, 2009.

Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.

European Patent Office, International Searching Authority, "International Search Report and Written Opinion," mailed Jun. 4, 2010 for International Application No. PCT/IN2009/000728, filed Dec. 18, 2009.

USPTO Non-Final Office Action mailed Jun. 23, 2010; U.S. Appl. No. 11/933,969, filed Nov. 1, 2007.

Korean Intellectual Property Office "Official Notice of Preliminary Rejection," issued Jun. 18, 2010; Korean Patent Application No. 10-2008-7021254.

USPTO Non-Final Office Action mailed Aug. 11, 2010; U.S. Appl. No. 11/111,265, filed Apr. 21, 2005.

USPTO Final Office Action mailed Sep. 24, 2010; U.S. Appl. No. 11/620,707, filed Jan. 7, 2007.

USPTO Non-Final Office Action mailed Sep. 30, 2010; U.S. Appl. No. 12/758,193, filed Apr. 12, 2010.

USPTO Non-Final Office Action mailed Sep. 29, 2010; U.S. Appl. No. 12/758,194 filed Apr. 12, 2010.

USPTO Non-Final Office Action mailed Oct. 4, 2010; U.S. Appl. No. 12/643,812, filed Dec. 21, 2009.

Japan Patent Office "Notice of Grounds for Rejection (Office Action)," mailed May 25, 2010; Patent Application No. 2007-527683.

Japan Patent Office "Notice of Grounds for Rejection (Office Action)," mailed May 25, 2010; Patent Application No. 2007-0268269.

China State Intellectual Property Office "Second Office Action of China State Intellectual Property Office," issued Aug. 26, 2010; Application No. 200810126554.0.

China State Intellectual Property Office "First Office Action of China State Intellectual Property Office," issued Oct. 9, 2010; Application No. 200780030811.4.

European Patent Office "EPO Communication" dated Nov. 29, 2010; Application No. 08 167 880.7-2202.

Korean Intellectual Property Office "Official Notice of Preliminary Rejection," issued Dec. 29, 2010; Patent Application No. Oct. 2009-7003607.

China Patent Office "Office Action" mailed Feb. 23, 2011; Chinese Patent Appln. No. 200680022520.6.

China Patent Office "Office Action" mailed Jan. 6, 2911; Chinese Patent Appln. No. 200810126554.0.

USPTO "Non-Final Office Action" mailed Mar. 4, 2011; U.S. Appl. No. 12/757,697, filed Apr. 9, 2010.

USPTO "Final Office Action" mailed Mar. 10, 2011; U.S. Appl. No. 11/111,265, filed Apr. 21, 2005.

Canadian Patent Office "Office Action" mailed Mar. 17, 2011; Canadian Patent Appln. No. 2,606,235.

Sikora, Thomas "Trends and Perspectives in Image and Video Coding," Proceedings of the IEEE, vol. 93 No. 1, pp. 6-17, Jan. 1, 2005.

Vetro, Anthony et al. "Video Transcoding Architectures and Techniques: An Overview," IEEE Signal Processing Magazine, vol. 20, No. 2, pp. 18-29, Mar. 1, 2003.

De Lattre, Alexis et al. "VideoLAN Streaming Howto," Internet Citation, Jan. 22, 2005; http://www.videolan.org/doc/streaming-howto/en/.

* cited by examiner

APPARATUS AND METHOD FOR EFFECTIVELY IMPLEMENTING A WIRELESS TELEVISION SYSTEM

CROSS-REFERENCE TO RELATED APPLICATIONS

This application is a division of, and claims priority in, U.S. patent application Ser. No. 09/809,868, entitled "Method for Implementing a Remote Display System with Transcoding" that was filed on Mar. 15, 2001 now U.S. Pat. No. 7,725,912; which is a continuation of, and claims priority in, U.S. patent application Ser. No. 09/318,904 entitled "Method for Effectively Implementing a Wireless Television System" that was filed on May 26, 1999 now U.S. Pat. No. 6,263,503. The foregoing related application is commonly assigned, and is hereby incorporated by reference.

BACKGROUND OF THE INVENTION

1. Field of the Invention

The present invention relates generally to enhanced television systems, and relates more particularly to an apparatus and method for effectively implementing a wireless television system.

2. Description of the Background Art

Developing an effective method for implementing enhanced television systems is a significant consideration for contemporary television designers and manufacturers. In conventional television systems, a display device may be utilized to view program information received from a program source. The conventional display device is typically positioned in a stationary location because of restrictions imposed by various physical connections that electrically couple the display device to input devices, output devices, and operating power. Other considerations such as display size and display weight may also significantly restrict viewer mobility in traditional television systems.

Portable television displays may advantageously provide viewers with additional flexibility when choosing an appropriate viewing location. For example, in a home environment, a portable television may readily be relocated to view programming at various remote locations throughout the home. A user may thus flexibly view television programming, even while performing other tasks in locations that are remote from a stationary display device.

However, portable television systems typically possess certain detrimental operational characteristics that diminish their effectiveness for use in modern television systems. For example, in order to eliminate restrictive physical connections, portable televisions typically receive television signals that are propagated from a remote terrestrial television transmitter to an antenna that is integral with the portable television. Because of the size and positioning constraints associated with a portable antenna, such portable televisions typically exhibit relatively poor reception characteristics, and the subsequent display of the transmitted television signals is therefore often of inadequate quality.

Other factors and considerations are also relevant to effectively implementing an enhanced wireless television system. For example, the evolution of digital data network technology and wireless digital broadcasting techniques may provide additional flexibility and increased quality to portable television systems. However, current wireless data networks typically are not optimized for flexible transmission and reception of video information.

Furthermore, a significant proliferation in the number of potential program sources (both analog and digital) may benefit a system user by providing an abundance of program material for selective viewing. In particular, an economical wireless television system for flexible home use may enable television viewers to significantly improve their television-viewing experience by facilitating portability while simultaneously providing an increased number of program source selections.

However, because of the substantially increased system complexity, such an enhanced wireless television system may require additional resources for effectively managing the control and interaction of various system components and functionalities. Therefore, for all the foregoing reasons, developing an effective method for implementing enhanced television systems remains a significant consideration for designers and manufacturers of contemporary television systems.

SUMMARY OF THE INVENTION

In accordance with the present invention, an apparatus and method are disclosed for effectively implementing a wireless television system. In one embodiment of the present invention, initially, one or more program sources are provided to a wireless base station that preferably differentiates the various types of program sources depending on whether the program source includes any combination of digital A/V data, analog video, or analog audio information.

If the program source includes digital A/V data, then, the wireless base station preferably formats the digital A/V data into an appropriate format, and provides the formatted data to a subsystem processor in the wireless base station. The subsystem processor responsively processes the formatted data to generate processed data (for example, by transcoding).

Similarly, if the program source includes analog video, then, the wireless base station preferably formats the analog video into an appropriate format, and provides the formatted video to the subsystem processor. The subsystem processor then responsively processes the formatted video to generate processed video.

In addition, if the program source includes analog audio, then, the wireless base station preferably formats the analog audio into an appropriate format, and provides the formatted audio to the subsystem processor. The subsystem processor then responsively processes the formatted audio to generate processed audio.

Next, the subsystem processor preferably combines the processed audio, video, and data into a processed stream. A communications processor then receives the processed stream, and responsively performs a wireless network processing procedure to generate a transmitter-ready stream. The communications processor may also advantageously receive and process various types of information from a wide-area network (such as the Internet).

Finally, a transmitter device receives and modulates the transmitter-ready stream, and advantageously performs a wireless network transmission process to propagate a broadcast stream to a remote TV, a remote controller, an auxiliary base station, or any other compatible display receiver device, in accordance with the present invention.

In certain embodiments, the foregoing communications processor may also provide information from various sources to a local-area network for transmission to the remote TV from an auxiliary base station that may preferably be coupled to the local-area network. For example, the communications processor may advantageously receive information from a wide-area network through a wide-area network interface, and responsively provide the information from the wide-area network to the foregoing local-area network through a local-area network interface.

The remote TV (or any other compatible display receiver device) preferably receives the broadcast stream from the wireless base station. A RF subsystem in the remote TV then preferably performs a wireless network processing procedure to generate a baseband stream. The foregoing wireless network processing procedure may include various appropriate techniques, such as demodulation and down-conversion of the broadcast stream propagated from the wireless base station.

An A/V decoder then preferably receives and demultiplexes the baseband stream into separate components which may include separate data, video, and audio information. If the baseband stream includes data information, then, the A/V decoder preferably manipulates the data information into an appropriate format to thereby generate manipulated data. Similarly, if the baseband stream includes video information, then the A/V decoder preferably decompresses the video information to generate decompressed video. In addition, if the baseband stream includes audio information, then the A/V decoder preferably decompresses the audio information to generate decompressed audio. The A/V decoder may then preferably provide the decompressed audio to an amplifier and speakers which operate to aurally reproduce the decompressed audio.

Concurrently, a display controller preferably may access the manipulated data and the decompressed video, and responsively perform a graphical user interface (GUI) processing procedure to generate display data and display video for presentation on the remote TV. Finally, the display controller provides the display data and the display video to the remote TV for remote viewing by a user of the wireless television system.

Therefore, the present invention effectively implements a flexible wireless television system that utilizes various heterogeneous components to facilitate optimal system interoperability and functionality. The present invention thus effectively and efficiently implements an enhanced wireless television system.

DETAILED DESCRIPTION OF THE PREFERRED EMBODIMENT

The present invention relates to an improvement in television systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention may comprise an apparatus and method for effectively implementing a wireless television system, and may preferably include a communications processor and a transmitter device that may combine at least one of a local-area network interface, a wide-area network interface, and one or more television data interfaces for effectively performing a wireless network transmission process. A transmitted stream from the wireless television system may preferably be received via wireless network processing for viewing local-area network data, wide-area network data (such as Internet data), or television data by flexibly utilizing various electronic devices such as a notepad personal computer, a personal digital assistant (PDA), or a handheld TV remote control device.

Figure 1:
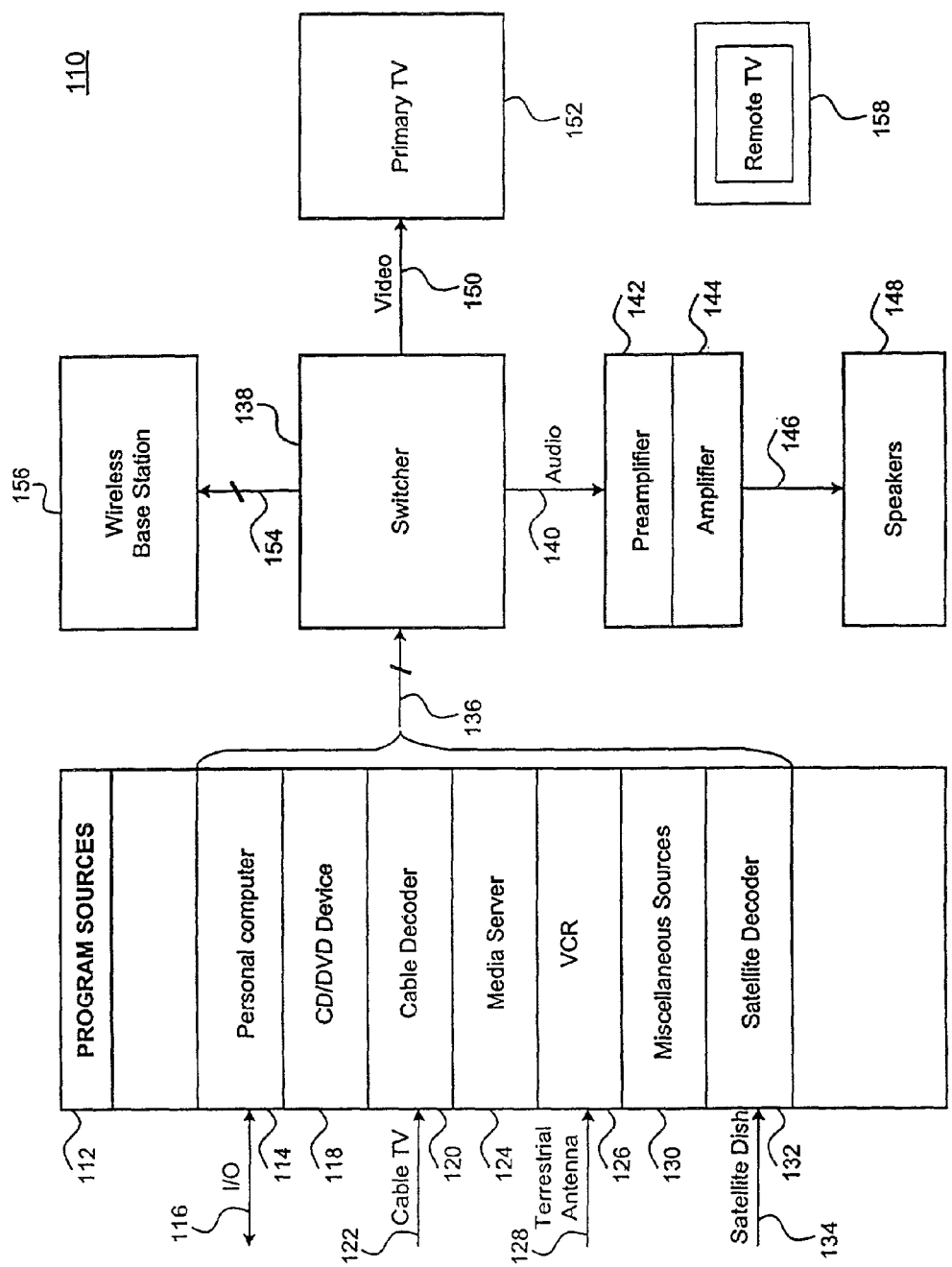
FIG. 1 is a block diagram of a basic wireless television system, in accordance with one embodiment of the present invention.

Referring now to FIG. 1, a block diagram of a basic wireless television system 110 is shown, in accordance with one embodiment of the present invention. In the FIG. 1 embodiment, wireless television system 110 preferably includes, but is not limited to, a number of programs sources 112, a switcher 138, a wireless base station 156, a primary television (TV) 152, a remote television (TV) 158, a preamplifier 142, an amplifier 144, and speakers 148. In other embodiments of the present invention, wireless television system 110 may readily include other components that are different from, or in addition to, those described in conjunction with the FIG. 1 embodiment.

In the FIG. 1 embodiment, wireless television system 110 is preferably configured for economical and efficient use in a home environment, however, in alternate embodiments, the present invention may be implemented for use in any appropriate environment. In the FIG. 1 embodiment, program sources 112 preferably comprise a selectable variety of consumer electronics devices that may include, but are not limited to, a personal computer 114 that communicates with other devices through input/output (I/O) path 116, a compact disk/digital video disk device (CD/DVD device) 118, a cable decoder 120 that receives a cable TV signal on path 122, a media server 124 that stores and provides various types of selectable programming, a video cassette recorder (VCR) 126 that receives a terrestrial antenna signal on path 128, miscellaneous sources 130 that may include any desired type of program sources, and a satellite decoder 132 that receives a satellite dish signal on path 134.

In alternate embodiments of the present invention, program sources 112 may readily be configured to include any other types of program sources or devices that are different from, or in addition to, those described in conjunction with the FIG. 1 embodiment. For example, program sources 112 may provide any type of information, including video, audio, or data sources, that may be formatted in any compatible or appropriate format. Furthermore, program sources 112 may readily be implemented to include information for use in environments other than economical consumer home applications. For example, wireless television system 110 may readily be configured to include program sources 112 that are intended for various other uses, including industrial, governmental, or scientific applications.

The present invention also supports various types of supplemental data transmissions that may be implemented as a separate program source 112, or may alternately be incorporated into another program source 112. For example, relevant program guide information and/or video channel guide information may be provided as a program source 112, or may be incorporated into another program source 112. Such program guide information may be provided in any suitable manner, including from a television broadcast vertical-blanking interval (VBI) signal, from MPEG system data, or from the Internet through a wide-area network (WAN) connection.

In the FIG. 1 embodiment, switcher 138 preferably receives individual program signals from each of the program sources 112 via path 136. Switcher 138 then preferably selects one or more of the program sources 112 as a switcher output program in response to control information typically provided by a viewer of system 110. Switcher 138 preferably provides video information from the switcher output program to primary TV 152 via path 150. Similarly, switcher 138 preferably provides audio information from the switcher output program to amplifier 144 through preamplifier 142 via path 140. Amplifier 144 then provides the amplified audio information to speakers 148 via path 146.

In accordance with the present invention, switcher 138 preferably also provides one or more program sources 112 to wireless base station 156 through path 154. In the FIG. 1 embodiment, wireless base station 156 is implemented as a discrete component in system 110. However, in alternate embodiments, wireless base station 156 may readily be implemented as part of a set-top box (not shown) or any other component in system 110. In addition, wireless base station 156 may readily receive program sources 112 using one or more different routings than that discussed in conjunction with the FIG. 1 embodiment. For example, wireless base station 156 may be implemented as part of primary TV 152 and then receive program sources 112 from a picture-in-picture (PIP) tuner corresponding to primary TV 152.

In accordance with the present invention, wireless base station 156 then advantageously processes the received program source(s) 112, and wirelessly transmits the processed program source(s) 112 as a broadcast stream to remote TV 158 for flexible remote viewing by a system user. The implementation and functionality of wireless base station 156 and remote TV 158 are further discussed below in conjunction with FIGS. 2 through 9.

Figure 2:
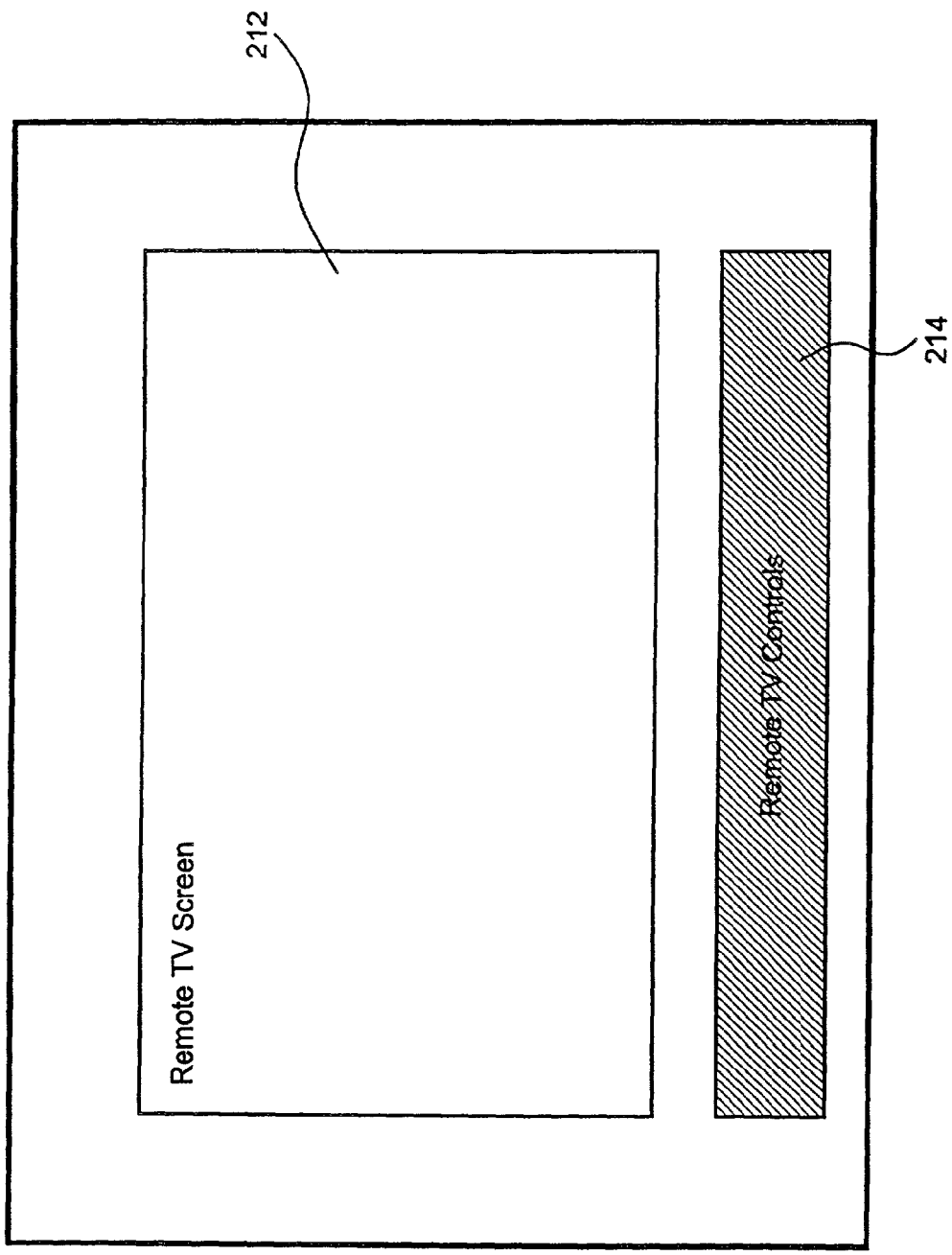
FIG. 2 is a drawing of the remote television of FIG. 1, in accordance with one embodiment of the present invention.

Referring now to FIG. 2, a drawing of the FIG. 1 remote TV 158 is shown, in accordance with one embodiment of the present invention. In the FIG. 2 embodiment, remote TV 158 preferably includes, but is not limited to, a remote TV screen 212 and remote TV controls 214. Remote TV 158 is preferably implemented as a light-weight portable display device that receives a broadcast stream from wireless base station 156, and responsively displays at least one selectable program source 112 on remote TV screen 212. In alternate embodiments, remote TV 158 may be implemented as a personal digital assistant (PDA) device, a notepad personal computer or any other desired display device.

In the FIG. 2 embodiment, remote TV controls 214 may include conventional controls and programmable controls that may be used by a viewer to control certain operating parameters of wireless television system 110. For example, remote TV controls 214 may be used either to control the operation of remote TV 158, or to control the operation of other components and subsystems in system 110 through a wireless transmission (for example, selecting a program source 112 through switcher 138). Remote TV screen 212 preferably includes color or monochrome display components that may be implemented using any appropriate and compatible display technology. In addition, remote TV screen 212 may employ touch-screen technology to control various display operating parameters as well as other technologies such as handwriting or voice input recognition.

In alternate embodiments, remote TV 158 may readily be implemented in any other desired manner. For example, remote TV 158 may be implemented as a wireless non-portable television in order to perform various types of special viewing applications that may require a wireless display. The operation and functionality of remote TV 158 are further discussed below in conjunction with FIG. 7.

Figure 3:
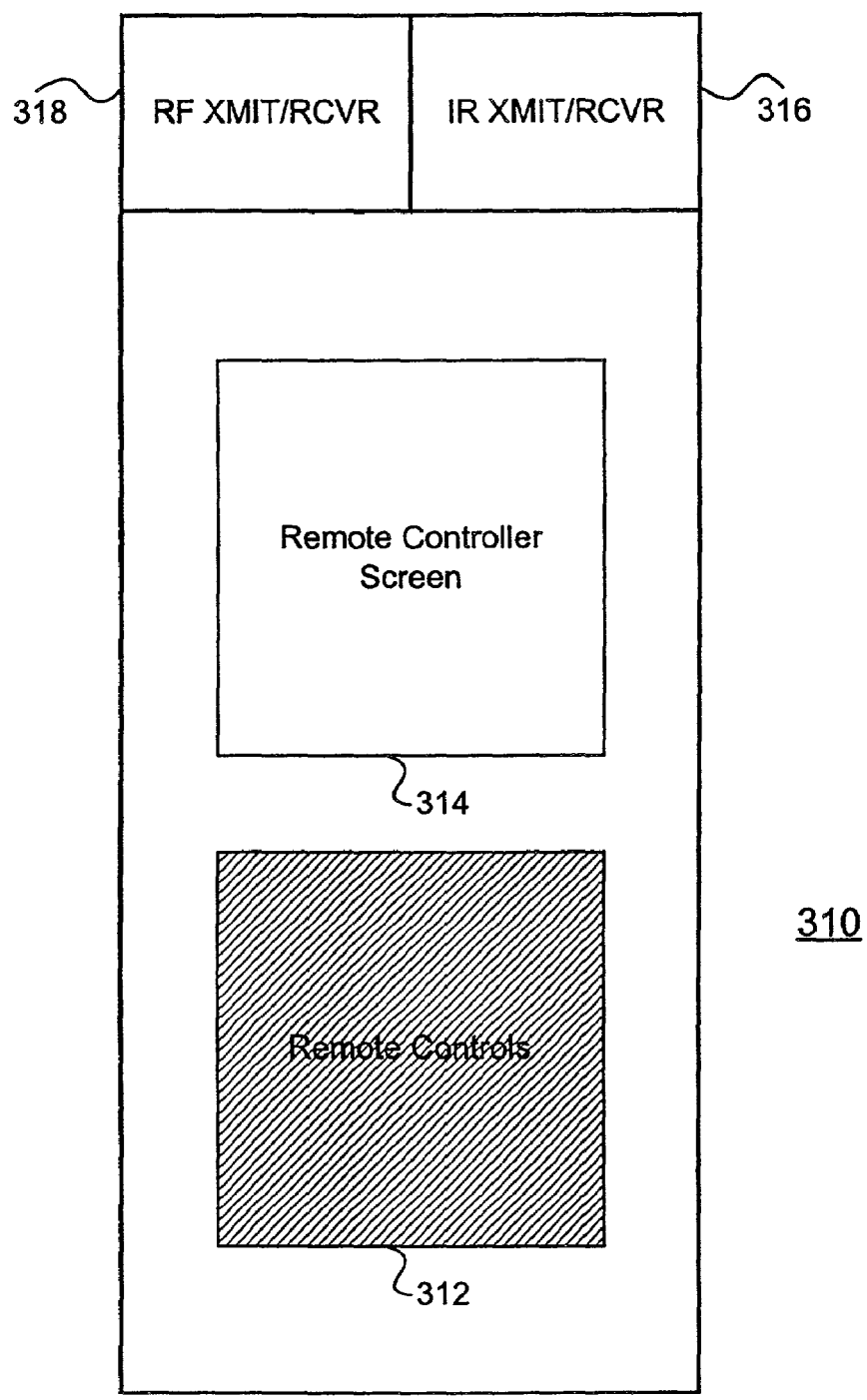
FIG. 3 is a drawing of a remote controller for use with the wireless television system of FIG. 1, in accordance with one embodiment of the present invention.

Referring now to FIG. 3, a drawing of a remote controller 310 for use with the FIG. 1 wireless television system 110 is shown, in accordance with one embodiment of the present invention. In the FIG. 3 embodiment, remote controller 310 is a hand-held device that preferably includes, but is not limited to, a remote controller screen 314, remote controls 312, a radio-frequency transmitter/receiver (RF XMIT/RCVR) 318 and an infrared transmitter/receiver (IR XMIT/RCVR) 316.

In the FIG. 3 embodiment, remote controls 312 may be used by a viewer to control various components and operating parameters of wireless television system 110. For example, remote controls 312 may be used to control the operation of other components and subsystems in system 110 through a wireless transmission process using either RF XMIT/RCVR 318 or IR XMIT/RCVR 316.

Remote controller screen 314 preferably includes display components that may be implemented using any appropriate and compatible display technology. Remote controller 310 may thus advantageously receive a broadcast stream from wireless base station 156 through either RF XMIT/RCVR 318 or IR XMIT/RCVR 316, and responsively display at least one selectable program source 112 on remote controller screen 314.

In one embodiment, remote controller screen 314 may thereby allow system users to preview various different selectable program sources 112 while simultaneously viewing an uninterrupted primary program source 112 on primary TV 152 or on remote TV 158. In the foregoing preview function, remote controller screen may receive a wireless transmission originating from a separate picture-in-picture (PIP) tuner in wireless television system 110. The preview function may therefore be utilized for functions like programming VCR 126 or previewing other channels without interrupting other concurrent program viewing activities. The operation and functionality of remote controller 310 are further discussed below in conjunction with FIG. 7.

Figure 4:
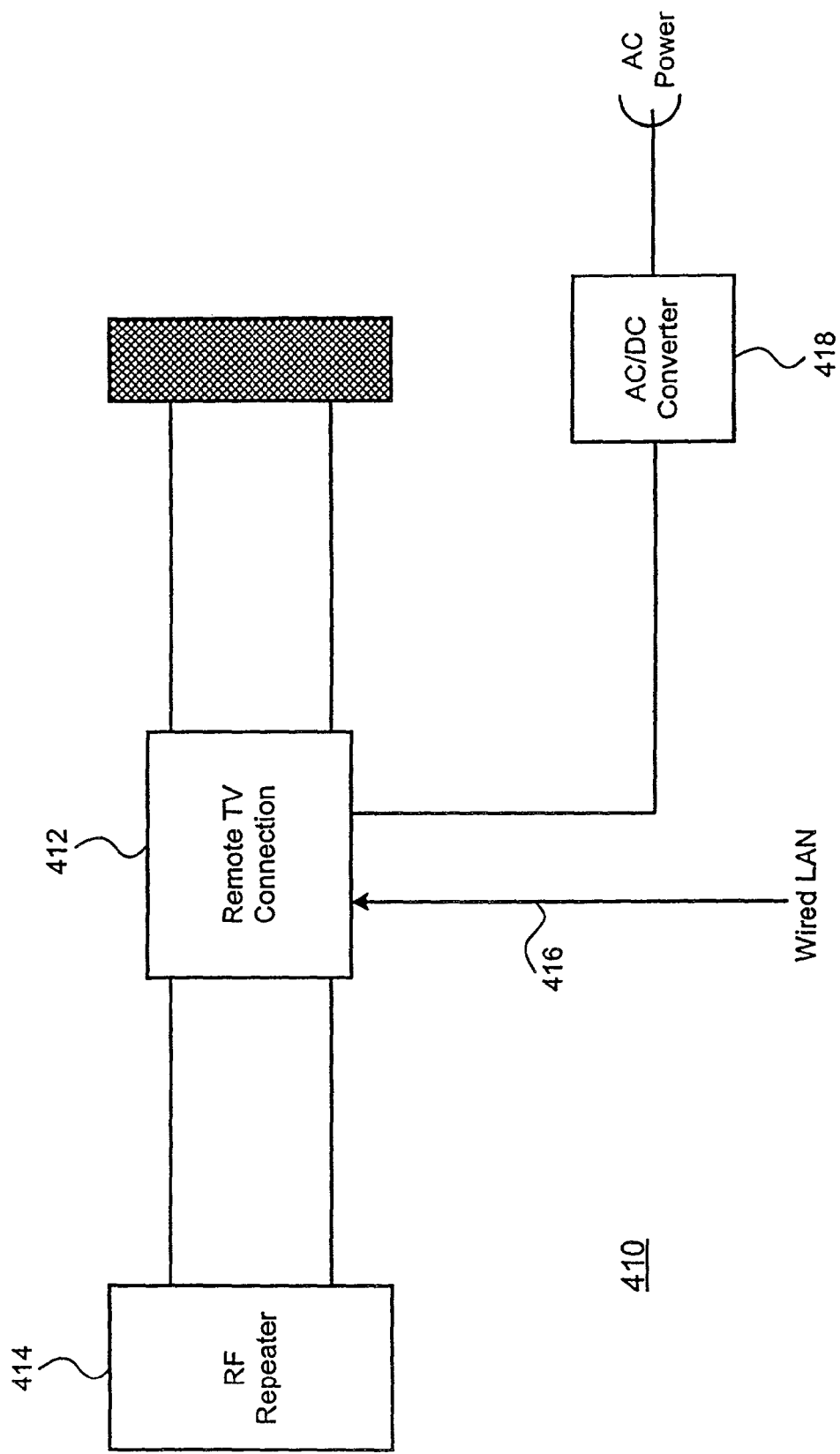
FIG. 4 is a drawing of an auxiliary base station for use with the wireless television system of FIG. 1, in accordance with one embodiment of present invention.

Referring now to FIG. 4, a drawing of an auxiliary base station 410 for use with the FIG. 1 wireless television system 110 is shown, in accordance with one embodiment of present invention. In the FIG. 4 embodiment, auxiliary base station 410 includes, but is not limited to, a radio-frequency (RF) repeater 414, a remote TV connection 412, and an alternating current/direct current (AC/DC) converter 418. In alternate embodiments, auxiliary base station 410 may readily be implemented to include various other components that are different from, or in addition to, those discussed in conjunction with the FIG. 4 embodiment.

In the FIG. 4 embodiment, RF repeater 414 preferably provides an enhanced transmission of one or more program sources 112 to remote TV 158 or remote controller 310 to thereby advantageously improve transmission quality in situations where remote TV 158 or remote controller 310 cannot receive adequate wireless transmissions directly from wireless base station 156. For example, various factors such as wall density and composition, or physical distances from wireless base station 156 may significantly deteriorate transmission strength and quality.

In accordance with the present invention, RF repeater 414 may then receive and enhance a broadcast stream that is transmitted directly from wireless base station 156 using radio-frequency transmission techniques. Alternately, RF repeater 414 may receive and enhance program source transmissions and transport various types of control information provided over a hard-wired home network (wired local-area network (LAN) 416) that may be implemented using any suitable techniques and configurations.

In certain embodiments, wireless television system 110 may include multiple auxiliary base stations 410 that each operate on a different transmission subchannel. In accordance with the present invention, remote TV 158 or remote controller 310 may therefore advantageously search to locate a particular subchannel that provides the highest quality transmission signal, and then transparently switch to the corresponding auxiliary base station 410 for optimal wireless transmission.

In the FIG. 4 embodiment, a system user may store remote TV 158 on auxiliary base station 410 by connecting remote TV 158 to remote TV connection 412. Further more, AC/DC converter 418 may provide operating power to RF repeater 414, and may also recharge batteries in remote TV 158 through remote TV connection 412.

Figure 5:
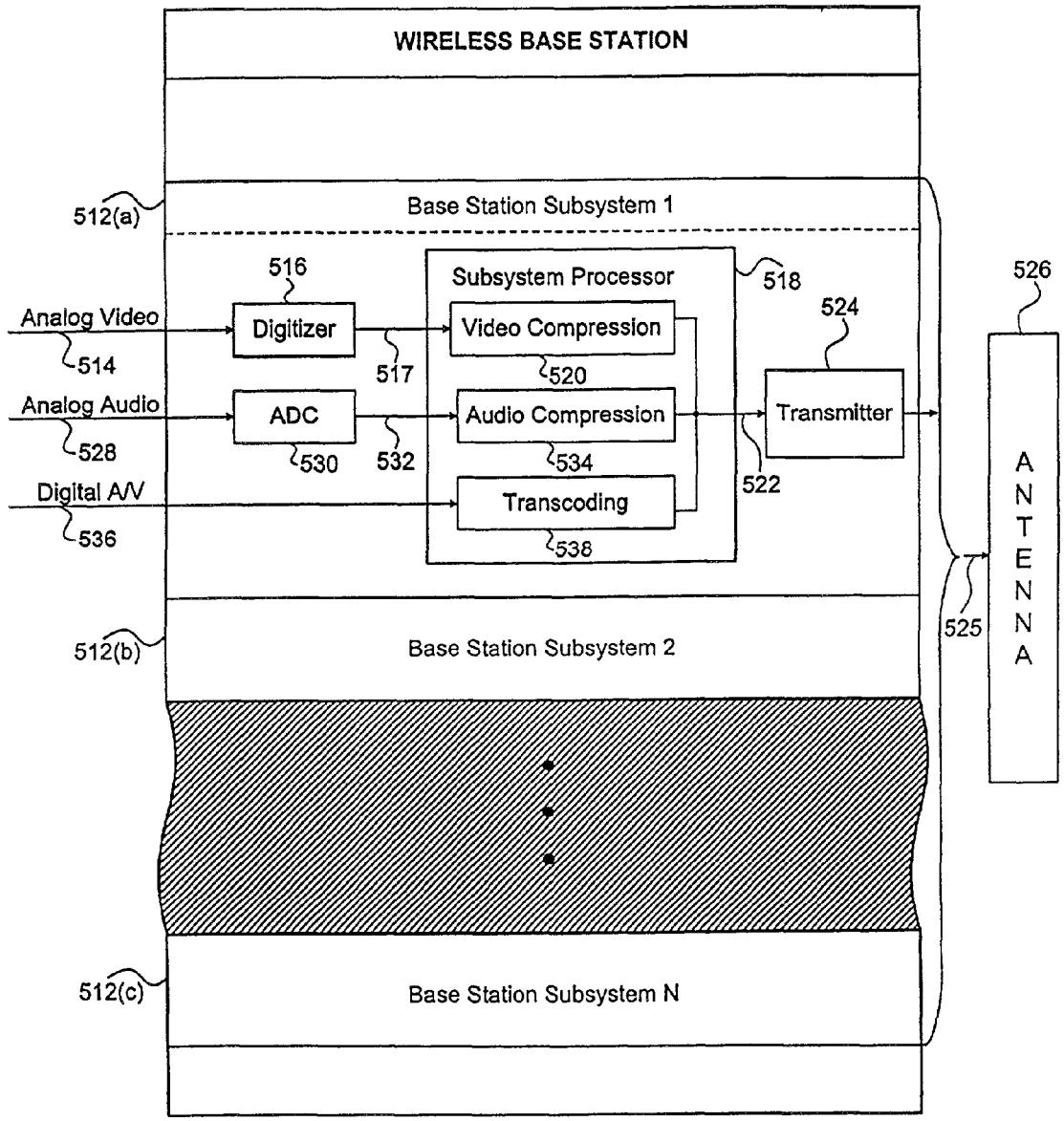
FIG. 5 is a block diagram of the wireless base station of FIG. 1, in accordance with one embodiment of present invention.

Referring now to FIG. 5, a block diagram of the FIG. 1 wireless base station 156 is shown, in accordance with one embodiment of present invention. In the FIG. 5 embodiment, wireless base station 156 preferably includes, but is not limited to, a base station subsystem 1 (512(a)) through a base station subsystem N (512(c)), and an antenna 526.

In the FIG. 5 embodiment, wireless base station 156 preferably may utilize various advanced radio-frequency transmission techniques, such as spread-spectrum broadcasting via code division multiple access (CDMA). Therefore, each base station subsystem (512(a) through 512(c)) may be efficiently implemented using a same or similar configuration, and may each correspond to a separate radio-frequency transmission sub-channel. However, for purposes of clarity in FIG. 5, only base subsystem 1 (512(a)) includes a block diagram of selected modules that are typically present in each base station subsystem 516(a through c) of wireless base station 156. In alternate embodiments, wireless base station 156 may readily be implemented to include various configurations, components, and subsystems other than those discussed in conjunction with the FIG. 5 embodiment.

In the FIG. 5 embodiment, base station subsystem 512(a) preferably receives various input signals that may include analog video on path 514, analog audio on path 528, and digital audio/video (A/V) data on path 536. In alternate embodiments, base station subsystem 512(a) may readily receive any other types of appropriate and compatible input signals.

In accordance with the present invention, subsystem processor 518 preferably receives various information from program sources 112 that may be encoded using an extensive variety of formats and configurations. Subsystem processor 518 then preferably processes and manipulates the received program sources 112 to advantageously generate processed program information in a particular format that is compatible for downstream use by transmitter 324 and remote TV 158. For example, in an economical home-use installation, subsystem processor 518 may receive a high-frequency digital video bitstream, and responsively downconvert the video bitstream to a bit rate that is more appropriate for economical transmission techniques. Subsystem processor 518 may also perform various other functions, including image bit allocation based on a particular configuration of remote TV 158, programmable image resolution with filtered image-size scaling, and identifier-key detection for enabling access to premium programming.

In the case of analog video information, digitizer 516 converts the analog video on path 514 into digital video that subsystem processor 518 then receives via path 517. Subsystem processor 518 responsively performs various signal processing procedures on the received digital video, preferably including video compression 520. In one embodiment of the present invention, video compression 520 preferably includes various MPEG-2 techniques and processes. Following the foregoing video signal processing procedures, subsystem processor 518 preferably provides the processed video to transmitter 524 via path 522.

Processing of video may also include various forms of frame rate conversion in order to reduce the bit rate provided to transmitter 524. In a simple example of reducing the frame rate, a 60 field NTSC input video may be dropped down to 30 fields per second by dropping every other field. A more complex technique for reducing the frame rate may include de-interlacing the fields into frames either through processing the fields or by detection of film content and through the technique of "3:2 pull down" converting the fields back to the original 24 frames per second of the movie content. Most LCD displays are non-interlaced and de-interlacing prior to transmission may result in a more efficient system.

In the case of analog audio information, analog-to-digital converter (ADC) 530 converts analog audio on path 528 into digital audio that subsystem processor 518 then receives via path 532. Subsystem processor 518 responsively performs various signal processing procedures on the received digital audio, preferably including audio compression 534. In one embodiment of the present invention, audio compression 534 preferably includes various MPEG-2 techniques and processes. Following the foregoing audio signal processing procedures, subsystem processor 518 preferably provides the processed audio to transmitter 524 via path 522.

In the case of digital audio/video data received on path 536, subsystem processor 518 performs various signal processing procedures on the received digital audio/video bitstream, preferably including transcoding 538. In one embodiment of the present invention, transcoding 538 preferably converts the digital A/V data received on path 536 into processed data that includes a different and more appropriate bit rate, as discussed above. Digital A/V bus may follow a standard such as the IEEE 1394. Alternatively, the video may be in an analog format while the audio follows a digital standard such as S/PDIF (Sony/Philips Digital Interface) where the audio can either be in a compressed or non-compressed digital format. Compressed audio may include multi-channel audio such as rear channels or a subwoofer channel. In the case of multi-channel audio, the signal processing of 518 may perform processing to reduce the number of audio channels either through dropping of audio channels or through processing to produce the effect of multiple audio channels coded into a reduced number of audio channels. Following the foregoing signal processing procedures, subsystem processor 518 provides the processed data to transmitter 524 via path 522.

Therefore, subsystem processor 518 may advantageously receive one or more program sources 112 that are formatted in any appropriate manner, and responsively generate a processed stream that is formatted in any appropriate manner. For example, subsystem processor 518 may receive MPEG-2 variable bit rate video programming and responsively generate a constant bit rate stream that may be formatted as an MPEG-2 elementary, packetized elementary, program or transport stream. Similarly, subsystem processor 518 may receive high-definition television (HDTV) video programming and responsively generate a standard definition television stream.

In the FIG. 5 embodiment, transmitter 524 may be implemented to include any desired types of effective transmission techniques, including spread spectrum methods via code division multiple access (CDMA) that may utilize frequency-hopping or direct sequencing techniques. Transmitter 524 preferably receives the processed and combined video, audio, and data from subsystem processor 518 as a transport stream, and responsively transmits a broadcast stream to remote TV 158 or remote controller 310 via path 525 and antenna 526. More detailed operation and functionality for one embodiment of a base station subsystem 512 are further discussed below in conjunction with FIG. 6.

Figure 6:
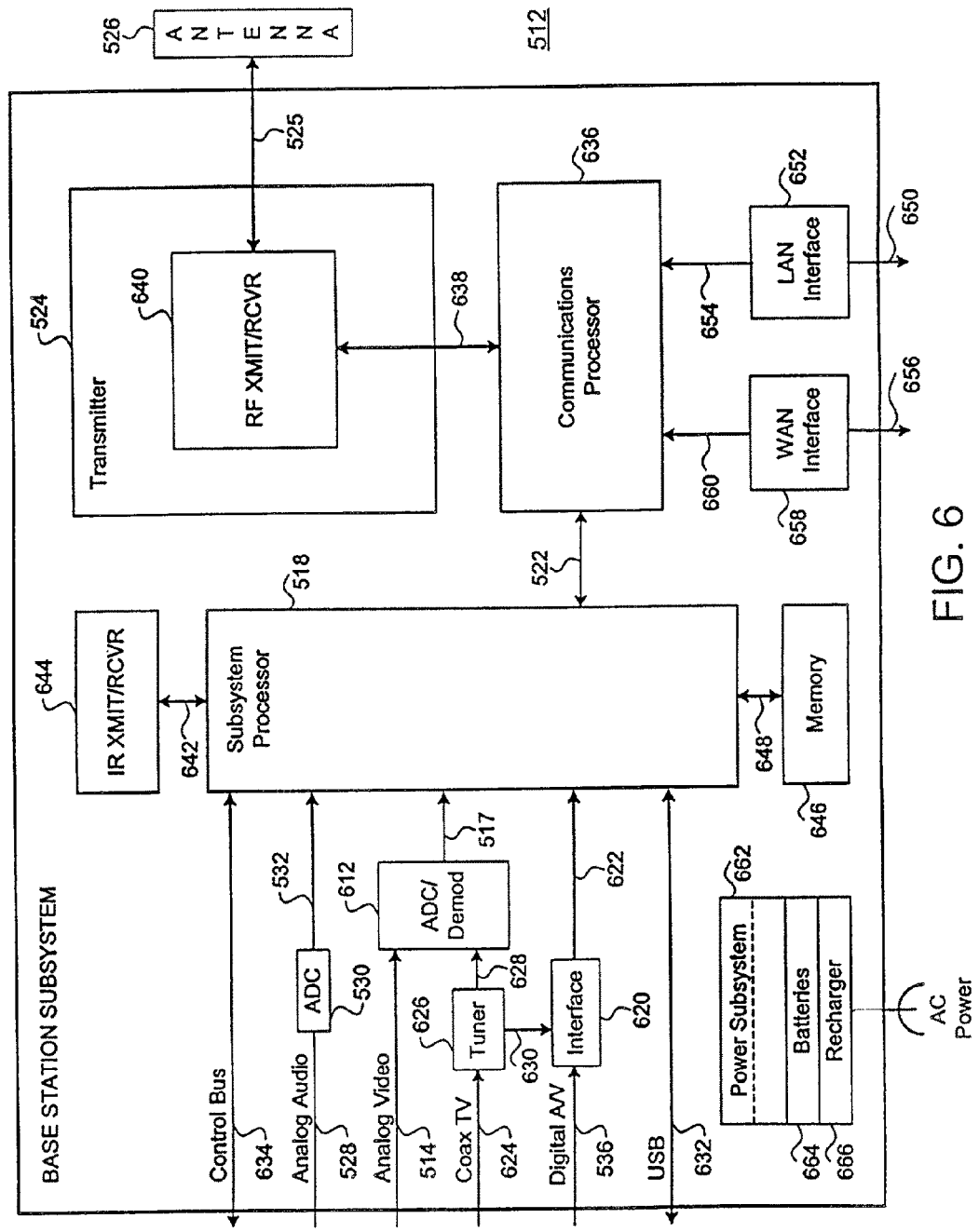
FIG. 6 is a block diagram of an exemplary base station subsystem, in accordance with one embodiment of present invention.

Referring now to FIG. 6, a block diagram of an exemplary base station subsystem 512 is shown, in accordance with one embodiment of the present invention. In the FIG. 6 embodiment, base station subsystem 512 preferably includes, but is not limited to, a subsystem processor 518, an infrared transmitter/receiver (IR XMIT/RCVR) 644, a memory 646, a wide-area network (WAN) interface 658, a local-area network (LAN) interface 652, a communications processor 636, a transmitter 524, an antenna 526, and a power subsystem 662. In alternate embodiments, base station subsystem 512 may readily be implemented to include various components that are different from, or in addition to, those discussed in conjunction with the FIG. 6 embodiment.

In the FIG. 6 embodiment, subsystem processor 518 preferably may receive various selectable program signals from any appropriate source, including program sources 112 (FIG. 1). Subsystem processor 518 then responsively processes and manipulates the received program signals to generate a processed output stream on path 522, as discussed above in conjunction with FIG. 5. Subsystem processor 518 preferably also communicates with memory 646 via path 648. Memory 646 may be configured using any desired format, and may be utilized to store any information required by wireless television system 110, including various processing software instructions for subsystem processor 518.

In the FIG. 6 embodiment, subsystem processor 518 may receive analog audio via path 528, analog-to-digital converter 530, and path 532. Subsystem processor 518 may also receive analog video via path 514, analog-to-digital converter/demodulator (ADC/Demod) 612, and path 517. Similarly, subsystem processor 518 may receive digital audio/video (A/V) data via path 536, bus interface 620, and path 622.

In addition, a tuner 626 may receive a coaxial television signal (Coax TV) on path 536 and responsively provide a selectable television source to subsystem processor 518 through either path 630 (for digital TV signals), or through path 628 (for analog TV signals). Subsystem processor 518 may also utilize universal serial bus (USB) 632 to communicate directly with various devices such as personal computer 114 (FIG. 1).

In accordance with the present invention, subsystem processor 518 may also advantageously communicate with compatible components throughout wireless television system 110 using a control bus 634. In the FIG. 6 embodiment, control bus 634 may be implemented using any compatible configuration and/or protocol. For example, control bus 634 may be effectively implemented in accordance with a control bus standard, and may also utilize various signaling protocols and techniques in compliance with a Home Audio-Video Home Interoperability (HAVI) standard.

In the FIG. 6 embodiment, subsystem processor 518 preferably combines processed video, processed audio, and processed data to thereby provide a processed stream comprising one or more selectable processed program sources 112 to communications processor 636 through path 522. In response, communications processor 636 performs a network processing procedure on the processed stream to generate a transmitter-ready stream to radio-frequency transmitter/receiver (RF XMIT/RCVR) 640 via path 638. Communications processor 636 preferably performs the foregoing network processing procedure in response to relevant characteristics of wireless television system 110. For example, the network processing procedure may depend on various factors such as the particular wireless transmission techniques utilized for effective wireless transmission or the type of bus arbitration required for WAN or LAN interfaces.

In the FIG. 6 embodiment, RF XMIT/RCVR 640 may then manipulate (for example, up-convert and modulate) the transmitter-ready stream to advantageously generate and transmit a broadcast stream through path 525 and antenna 526 to remote TV 158, remote controller 310, or auxiliary base station 410, in accordance with the present invention. In the FIG. 6 embodiment, RF XMIT/RCVR 640 may be implemented to include any desired types of effective up-conversion, modulation, or other wireless transmission techniques, including spread spectrum methods via code division multiple access (CDMA) that may utilize appropriate frequency-hopping or direct sequencing techniques. In one embodiment of the present invention, subsystem processor 518 may also transmit the processed stream to remote TV 158, remote controller 310, or auxiliary base station 410 using IR XMIT/RCVR 644. Wireless base station 156 also preferably embodies one or more effective transmission protocols that include isochronous support for transmission of multimedia information.

In the FIG. 6 embodiment, base station subsystem 512 may communicate with various wide-area networks (such as the Internet) via WAN interface 656. For example, subsystem processor 518 may readily access digital A/V data from the Internet via path 656, WAN interface 658, path 660, communications processor 636, and path 522. Subsystem processor 518 may then process the Internet A/V data, and subsequently provide the processed Internet A/V data through path 522 to communications processor 636 for wireless transmission by RF XMIT/RCVR 640, as discussed above. In accordance with the present invention, communications processor 636 may also provide the transmitter-ready stream to RF repeater 414 in auxiliary base station 410 via path 654, LAN interface 652, and path 650, as discussed above in conjunction with FIG. 4. In some systems, for example a cable modem system, the WAN connection 656 may physically be the same as the Coax TV interface 624. In another system, such as a home network using the standard phone line, the WAN connection 656 may physically be the same as the LAN interface connection 650.

In the FIG. 6 embodiment, remote TV 158 or remote controller 310 may advantageously transmit wireless radio-frequency control information to subsystem processor 518 through antenna 526, RF XMIT/RCVR 640, and communications processor 636. In response, subsystem processor 518 may function as a master controller to utilize the received wireless radio-frequency control information for controlling various components and functionalities in wireless television system 110. Subsystem processor 518 may use the received RF control information in any suitable manner. For example, subsystem processor 518 may control appropriate system components either by hard-wired connections, by utilizing control bus 634, or by transmitting the control information through path 642 and infrared transmitter/receiver (IR XMIT/RCVR) 644.

In accordance with the present invention, subsystem processor 518 may also utilize IR XMIT/RCVR 644 and RF XMIT/RCVR 640 to advantageously monitor all remotely-generated system control signals. Subsystem processor 518 may then responsively maintain corresponding system component status information in memory 646 to facilitate intelligent system control interaction in wireless television system 110. For example, a system user in a viewing location that is remote from program sources 112 may be unaware of the current status of a given program source, such as VCR 126. According to the present invention, subsystem processor 518 may therefore utilize the stored component status information to intelligently respond to a remote viewer request that is provided by wireless transmission from remote TV 158 or remote controller 310.

In the FIG. 6 embodiment, power subsystem 662 preferably provides operating power for base station subsystem 512. Power subsystem 662 preferably includes a recharger 666 for recharging remote TV 158 and remote controller 310. Power subsystem 622 also preferably includes batteries 664 which may serve as a backup power source so that, even when main operating power is turned off, base station subsystem 512 may still monitor system control information to components of wireless television system 110, and thereby maintain current system status information in memory 646.

Figure 7:
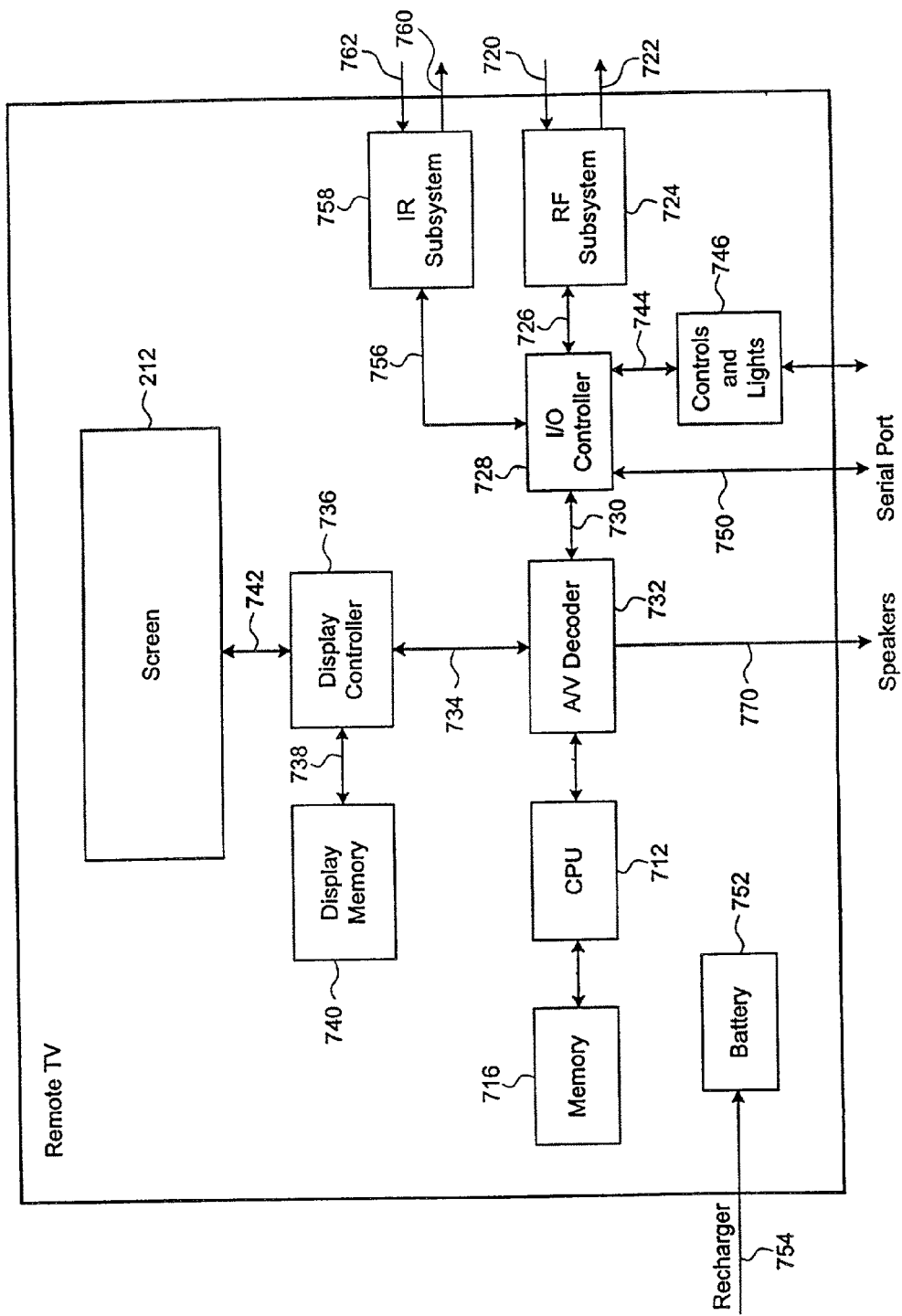
FIG. 7 is a block diagram of the remote television from FIG. 1, in accordance with one embodiment of present invention.

Referring now to FIG. 7, a block diagram of the FIG. 1 remote TV 158 is shown, in accordance with one embodiment of present invention. For reasons of clarity, the following discussion of the FIG. 7 embodiment is made in reference to remote TV 158. However, in accordance with the present invention, the FIG. 7 embodiment is equally descriptive of selected functional components from either remote TV 158 or remote controller 310. In alternate embodiments, remote TV 158 and remote controller 310 may readily be implemented using various techniques and designs other than those discussed in conjunction with the FIG. 7 embodiment.

In the FIG. 7 embodiment, remote TV 158 preferably receives a broadcast stream from RF XMIT/RCVR 640 of wireless base station 156 (or RF repeater 414 of auxiliary base station 410) through an integral portable antenna that couples the broadcast stream through path 720 to radio-frequency (RF) subsystem 724. Radio-frequency (RF) subsystem 724 responsively processes (for example, down-converts and demodulates) the broadcast stream to generate a baseband stream.

Input/output (I/O) controller 728 then preferably receives the baseband stream via path 726 and responsively provides the baseband stream via path 730 to audio/video (A/V) decoder 732. Under the control of central processing unit (CPU) 712, and in response to various software instructions stored in memory 716, A/V decoder then preferably demultiplexes and decodes the baseband stream to generate separate decoded video, audio, and data information.

Display controller 736 may then receive the decoded video and data via path 734, and temporarily store the decoded video and data into display memory 740 via path 738. At the appropriate time, display controller 736 may then retrieve the decoded video and data from display memory 740, and provide the decoded video and data via path 742 to remote TV screen 212 for display to a system user. Display controller 736 may also provide the decoded audio to an amplifier and speakers for aural reproduction via path 770.

In the FIG. 7 embodiment, infrared (IR) subsystem 758 may alternately receive a broadcast stream from IR XMIT/RCVR 644 of wireless base station 156 through path 762. IR subsystem 758 may then provide the broadcast stream to I/O controller 728 via path 756 for further downstream manipulation and display, as discussed above.

In accordance with the present invention, a system user may supply desired component control information to I/O controller 728 by using controls and lights 746 and path 744, or by using any other appropriate means. I/O controller may then wirelessly transmit the component control information to wireless base station 156 via path 726, RF subsystem 724, and path 722, or via path 756, IR subsystem 758, and path 760, as discussed above in conjunction with FIG. 6.

In the FIG. 7 embodiment, remote TV 158 preferably includes a battery 752 that supplies display operating power, and which may be recharged via path 754. Remote TV 158 may also comprise a serial port 750, such as a universal serial bus (USB), for connecting remote TV 158 to a host personal computer to thereby allow various interactive processes, including performing setup, data exchange, and backup procedures for remote TV 158. Alternatively, the host personal computer may use the RF, IR or LAN connections for setup, data exchange and backup procedures for remote TV 158.

Figure 8:
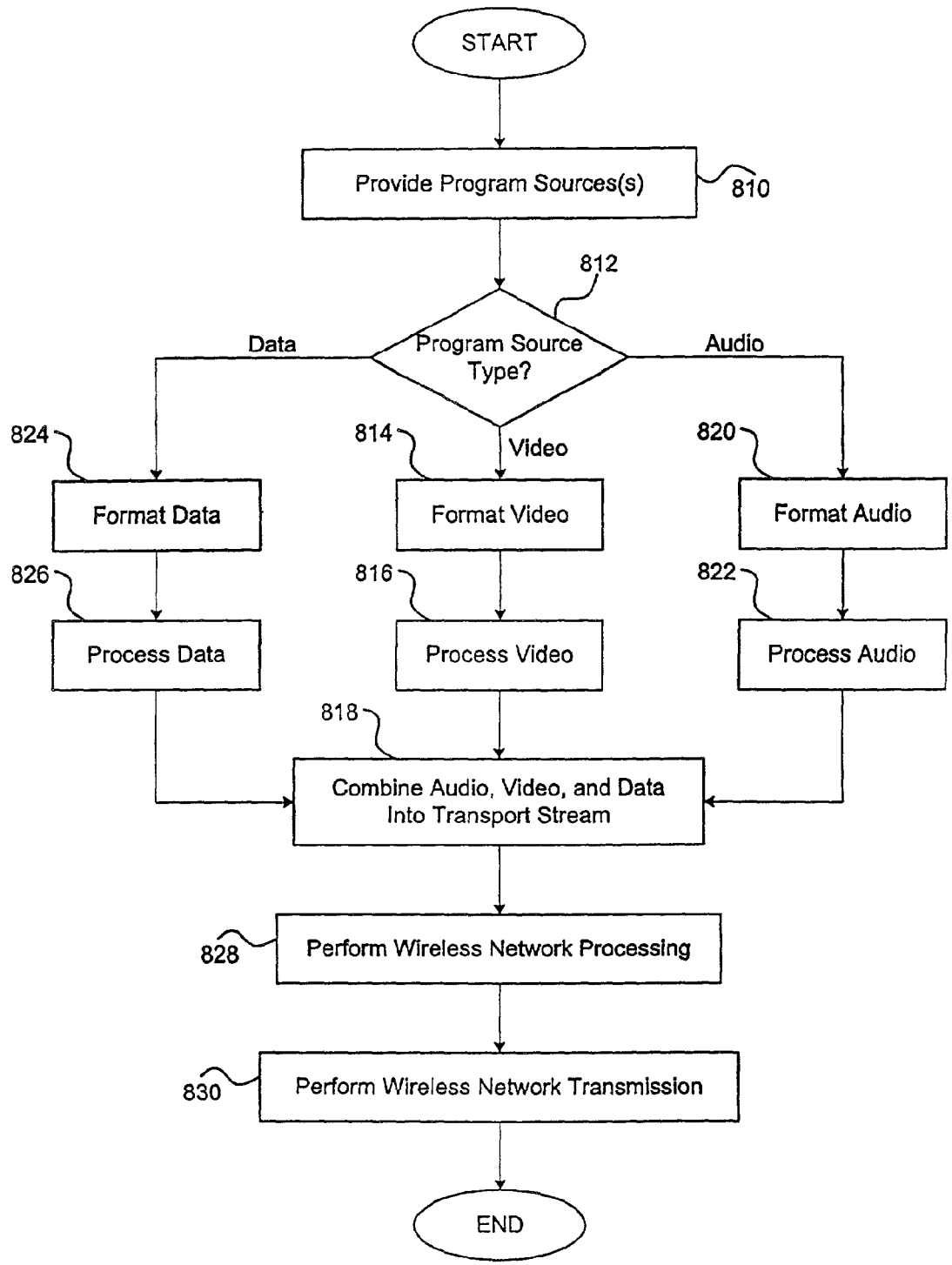
FIG. 8 is a flowchart of method steps for performing a wireless transmission procedure, in accordance with one embodiment of present invention.

Referring now to FIG. 8, a flowchart of method steps for performing a wireless transmission procedure is shown, in accordance with one embodiment of present invention. In the FIG. 8 embodiment, initially, in step 810, wireless television system 110 provides one or more program sources 112 to wireless base station 156. In step 812, wireless base station 156 differentiates various types of program sources 112 depending on whether the program source(s) 112 include any combination of digital A/V data, analog video, or analog audio information.

If program source 112 includes digital A/V data, then, in step 824, wireless base station 156 preferably formats the digital A/V data into an appropriate format, and provides the formatted data to subsystem processor 518 in wireless base station 156. In step 826, subsystem processor 518 responsively processes the formatted data to generate processed data (for example, by transcoding), and then the FIG. 8 process advances to step 818.

Similarly, if program source 112 includes analog video, then, in step 814, wireless base station 156 formats the analog video into an appropriate format, and provides the formatted video to subsystem processor 518 in wireless base station 156. For example, ADC/Demod 612 may convert the analog video into an appropriate digital format. Then, in step 816, subsystem processor 518 responsively processes the formatted video to generate processed video, and the FIG. 8 process advances to step 818.

In addition, if program source 112 includes analog audio, then, in step 820, wireless base station 156 formats the analog audio into an appropriate format, and provides the formatted audio to subsystem processor 518 in wireless base station 156. For example, ADC 530 may convert the analog video into an appropriate digital format. In step 822, subsystem processor 518 responsively processes the formatted audio to generate processed audio, and then the FIG. 8 process advances to step 818.

In step 818, subsystem processor 518 preferably combines the processed audio, video, and data into a processed stream. Then, in step 828, communications processor 636 receives the processed stream generated in foregoing step 818, and responsively performs a wireless network processing procedure to generate a transmitter-ready stream. Finally, in step 830, transmitter 524 receives and modulates the transmitter-ready stream, and advantageously performs a wireless network transmission process to propagate a broadcast stream to remote TV 158, remote controller 310, auxiliary base station 410, or any other compatible receiver device, in accordance with the present invention.

Figure 9:
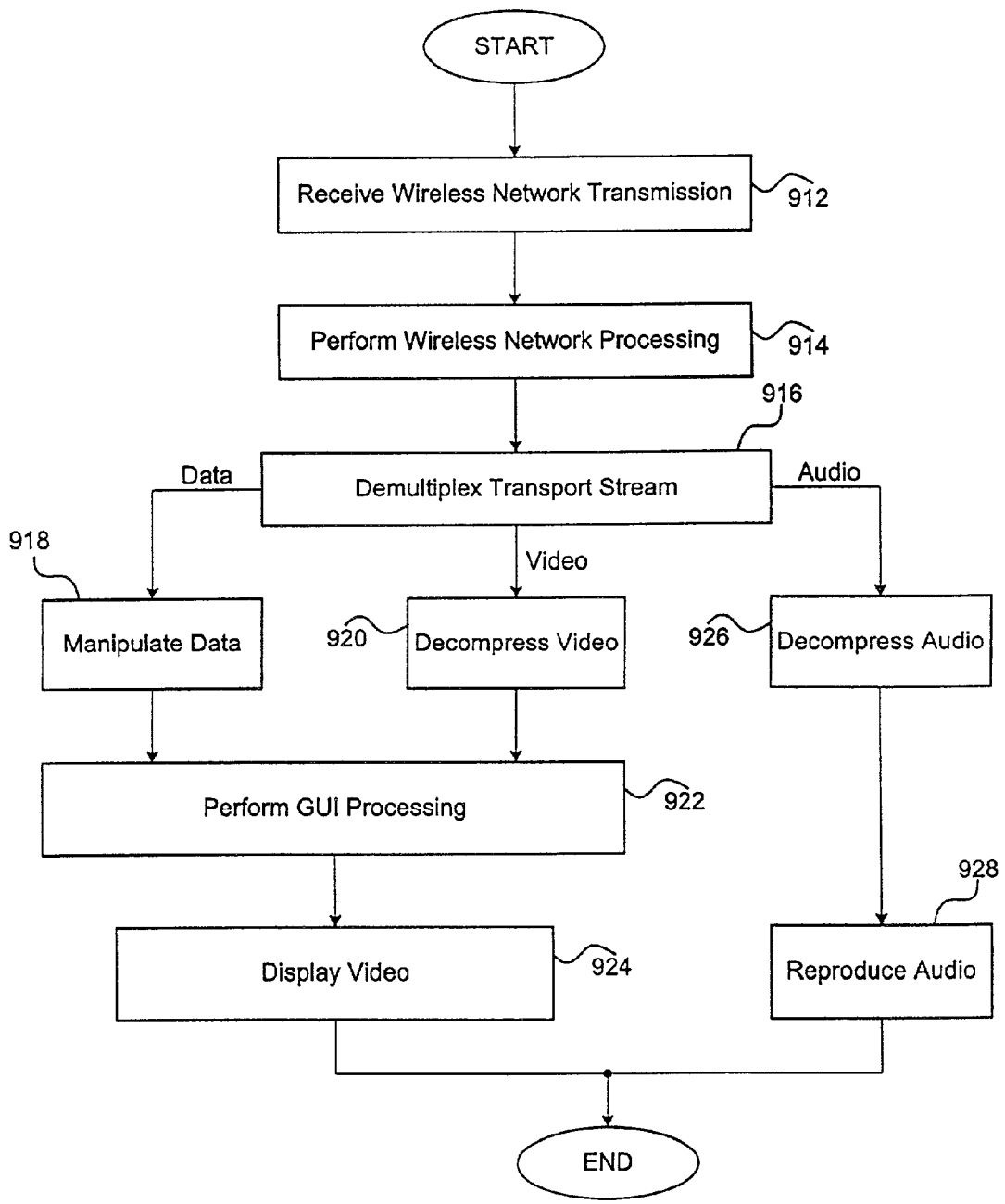
FIG. 9 is a flowchart of method steps for performing a wireless reception procedure, in accordance with one embodiment of present invention.

Referring now to FIG. 9, a flowchart of method steps for performing a wireless reception procedure is shown, in accordance with one embodiment of present invention. For reasons of clarity, the FIG. 7 wireless reception procedure is discussed in reference to remote TV 158. However, wireless reception by remote controller 310, auxiliary base station 410, or any other compatible receiver device is equally contemplated for use in conjunction with the present invention.

In the FIG. 9 embodiment, initially, in step 912, remote TV 158 preferably receives a broadcast stream from wireless base station 156. Then, in step 914, RF subsystem 724 preferably performs a wireless network processing procedure to generate a baseband stream. The foregoing wireless network processing procedure may include various appropriate techniques, such as demodulation and down-conversion of the broadcast stream propagated from wireless base station 156.

In step 916, A/V decoder 732 preferably receives and demultiplexes the baseband stream into separate components which may include separate data, video, and audio information. If the baseband stream includes data information, then, in step 918, A/V decoder 732 preferably manipulates the data information into an appropriate format to generate manipulated data, and the FIG. 9 process advances to step 922. Similarly, if the baseband stream includes video information, then, in step 920, A/V decoder 732 preferably decompresses the video information to generate decompressed video, and the FIG. 9 process advances to step 922.

In addition, if the baseband stream includes audio information, then in step 926, A/V decoder 732 preferably decompresses the audio information to generate decompressed audio. In step 928, A/V decoder 732 may preferably provide the decompressed audio to an amplifier and speakers which operate to aurally reproduce the decompressed audio.

In step 922, display controller 736 preferably may access the manipulated data (step 918) and the decompressed video (step 920), and responsively perform a graphical user interface (GUI) processing procedure to generate display data and display video for presentation on remote TV 158. Finally, in step 924, display controller 736 provides the display data and the display video to remote TV screen 212 for viewing by a user of wireless television system 110.

The present invention therefore implements a flexible wireless television system that a user may effectively utilize in a wide variety of applications. For example, a video camera device may generate a wireless transmission to remote TV 158 for purposes such as surveillance and monitoring, or the transmission can be received by wireless base station 156 and the transmission stored on a connected storage device. Remote TV 158 may also generate a query to wireless television system 110 for purposes such as determining current programming of VCR 126. A user may likewise receive a telephone communication via remote TV 158 while simultaneously viewing a caller ID display, or may similarly utilize wireless television system to interact with an Internet browser program.

In addition, a viewer may flexibly utilize wireless television system 110 for displaying information from a home server (such as viewing a personal recipe collection while cooking), for displaying various user profiles (such as a particular viewer's favorite television channels), or for sequencing through images in a "picture frame" mode when remote TV 158 is not otherwise in use. Therefore, the present invention effectively implements a flexible wireless television system that utilizes various heterogeneous components to facilitate optimal system interoperability and functionality.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A base station comprising:
  a switcher configured to receive program information from at least one program source;
  a first processor configured to process the program information generated by the at least one program source to generate a digital processed stream;
  a second processor coupled to the first processor, the second processor configured to perform a network processing procedure on the digital processed stream to produce an output stream for transmission; and
  a network interface configured to transmit the output stream over a network to a display system using a type of bus arbitration, wherein the network processing procedure depends upon the type of bus arbitration.

2. A base station comprising:
  a network interface configured to communicate on a network using a type of bus arbitration;
  a switcher configured to receive program information from at least one program source; and
  a processor configured to generate a processed stream from the program information received from the program source, wherein the processed stream depends upon the type of bus arbitration used by the network interface, and wherein the processed stream is transmitted from the base station to a remote device via the network.

3. The base station of claim 2 wherein the at least one program source is selected from a plurality of program sources that each provide program information to the switcher.

4. The base station of claim 3 wherein the at least one program source is selected in response to control signals received from the remote device via the network.

5. The base station of claim 3 wherein the processor is configured to combine video information from the program information received from a first one of the plurality of program sources with processed data stream information received from another of the plurality of program sources to produce a combined video image.

6. The base station of claim 5 wherein the processor is further configured to perform a video compression procedure on the combined video image.

7. The base station of claim 3 wherein the processor is configured to combine video information from the program information received from a first one of the plurality of program sources with data information provided from a non-program source to produce a combined video image.

8. The base station of claim 7 wherein the processor is further configured to perform a video compression procedure on the combined video image.

9. The base station of claim 3 wherein the processor is configured to combine processed video, processed audio, and processed data from at least one of the plurality of program sources to create the processed stream, and to perform a network processing procedure on the processed stream.

10. The base station of claim 2 further comprising a memory configured to store component status information about the at least one program source, and wherein the processor is configured to use the component status information to respond to a viewer request received from the remote device.

11. The base station of claim 2 further comprising a memory configured to store user profile information, and wherein the processor is configured to use the user profile information to respond to a viewer request received from the remote device.

12. A base station comprising:
a network interface configured to communicate on a network;
a radio-frequency transmitter;
a switcher configured to receive program information from at least one program source;
a processor configured to generate a processed stream from the program information received from the program source, wherein the processed stream is transmitted from the base station to a remote device via at least one of the radio-frequency transmitter and the network interface,
wherein the processed stream depends upon a type of bus arbitration used by at least one of the network interface or the radio-frequency transmitter.

13. The base station of claim 12 further comprising a memory configured to store user profile information, and wherein the processor is configured to use the user profile information to respond to a viewer request received from the remote device.

14. The base station of claim 12 wherein the base station comprises a communications processor configured to receive the processed stream from the processor and to perform a network processing procedure on the processed stream before the processed stream is transmitted to the remote device.

15. A method executable by a base station that provides program information to a display system via a network, the method comprising:
receiving the program information generated by a program source;
processing the received program information to generate a transmitter-ready stream based upon a type of bus arbitration used by an interface to the network; and
transmitting the transmitter-ready stream over a network to the display system using the interface to the network.

16. The method of claim 15 wherein the processing is adapted in response to control signals received from the remote device via the network.

17. The method of claim 16 wherein the adapting comprises adjusting encoding of the received program information in response to the control signals.

18. The method of claim 16 wherein the adapting comprises adjusting compressing of the received program information in response to the control signals.

19. The method of claim 16 wherein the adapting comprises adjusting the type of bus arbitration used by the interface in response to the control signals.

20. The method of claim 16 wherein the processing comprises combining video information from the program information received from a first one of a plurality of program sources with processed data stream information received from a second one of the plurality of program sources to produce a combined video image.

21. The method of claim 20 wherein the processing further comprises compressing the combined video image.

22. The method of claim 16 wherein the processing comprises combining video information from the program information with data information provided from a non-program source to produce a combined video image.

23. The method of claim 22 wherein the processing further comprises compressing the combined video image.

* * * * *